T. WARDELL.
PEDAL OPERATED CONTROLLER FOR ELECTROMAGNETIC CHANGE SPEED GEARS.
APPLICATION FILED MAR. 25, 1918.
1,319,542.
Patented Oct. 21, 1919.
3 SHEETS—SHEET 1.
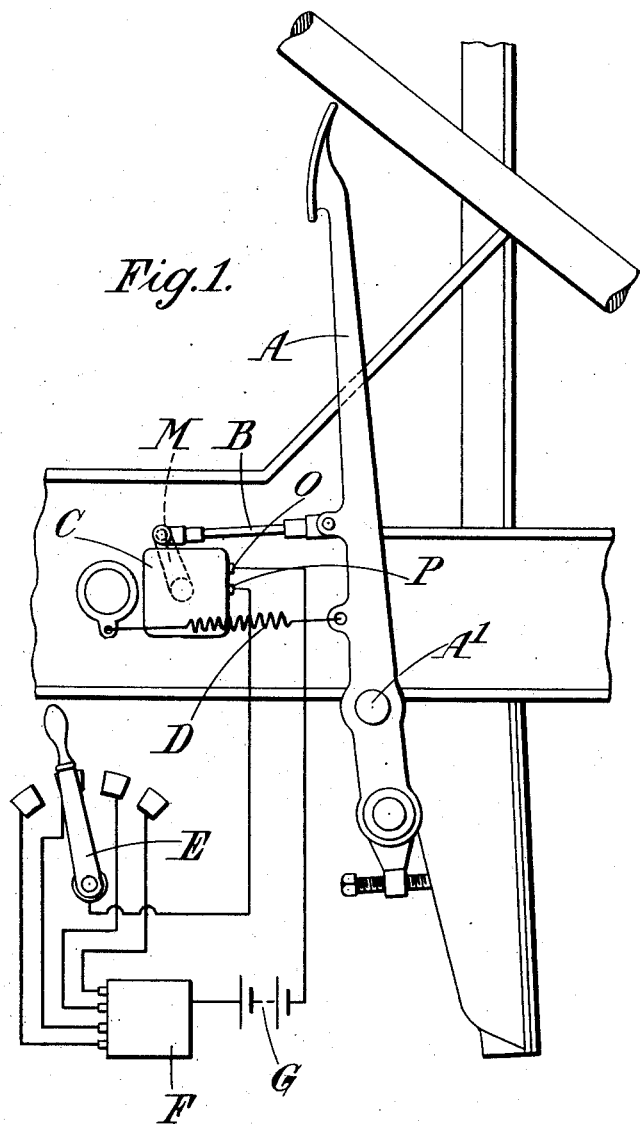

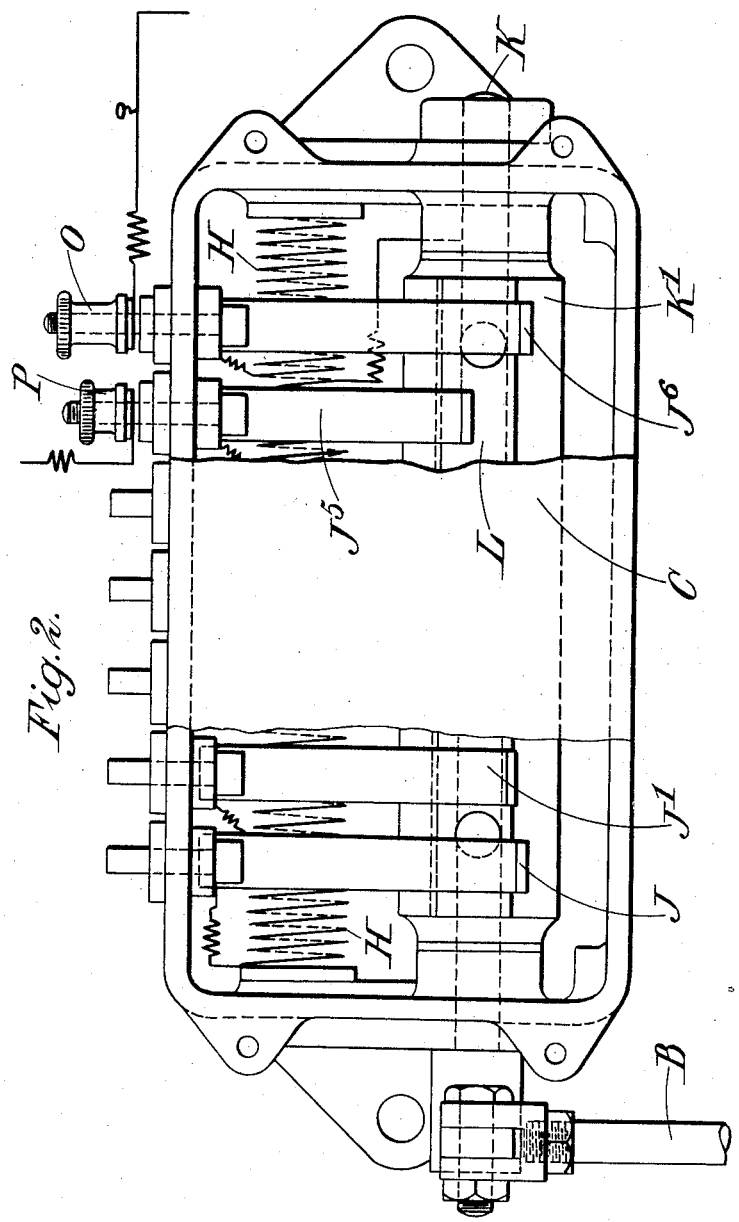

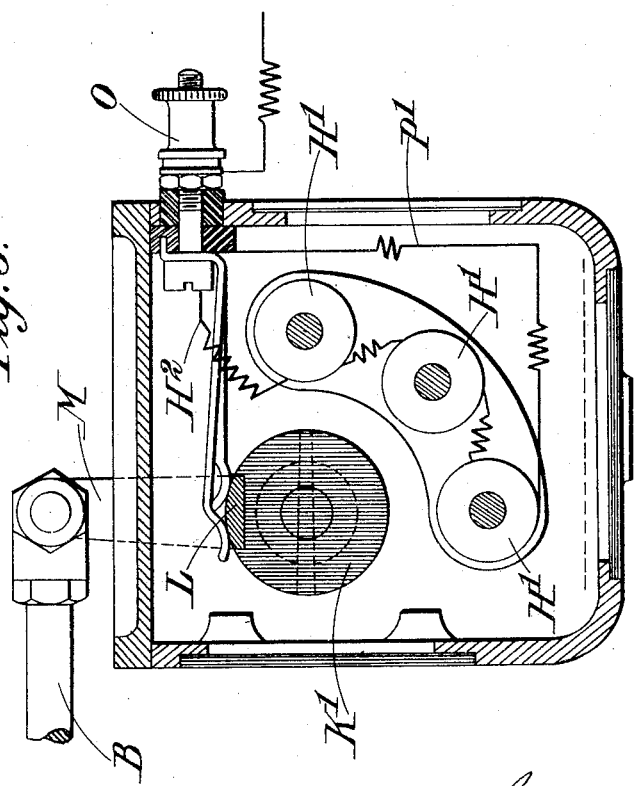

UNITED STATES PATENT OFFICE.

THOMAS WARDELL, OF BIRMINGHAM, ENGLAND, ASSIGNOR TO THE MENCO-ELMA SYNDICATE LIMITED, OF LONDON, ENGLAND.

PEDAL-OPERATED CONTROLLER FOR ELECTROMAGNETIC CHANGE-SPEED GEARS.

1,319,542. Specification of Letters Patent. Patented Oct. 21, 1919.

Application filed March 25, 1918. Serial No. 224,685.

*To all whom it may concern:*

Be it known that I, THOMAS WARDELL, a subject of the King of England, residing in Birmingham, England, have invented a certain new and useful Improvement in Pedal-Operated Controllers for Electromagnetic Change-Speed Gears, of which the following is a specification.

This invention relates to the type of gear-box for changing speed and reversing, and if desired braking, in which the changes are effected through the medium of electromagnetic clutches, or clutches and brakes, such, for instance, as are described in British patent specification No. 1853 of 1912.

In this type of gear-box it has been usual to switch on the full current suddenly, with the result that in starting the automobile on which the gear-box is used, the vehicle starts away with a jerk, owing to the sudden full magnetization of the magnets in use; furthermore, in braking, the pull-up is inconveniently sudden.

The principal object of the present invention is to avoid the aforesaid suddenness of operation of the magnets with a view to obtaining smoother action thereof, and, moreover, it is the object of the present invention to provide such a construction of parts that the operations performed by the driver with this type of gear shall be closely analogous to, if not actually identical with, those performed by him upon a vehicle fitted with the ordinary type of clutch and clutch-pedal, together with the usual change-speed lever.

The present invention therefore provides the combination with a gear-box of the type defined, of pedal-operated means to control the current strength supplied to the gear-box which said means are so constructed that the current strength is a minimum or zero when the pedal is fully depressed and increases gradually to a maximum as the pedal is allowed to rise.

The control of current strength may be effected by variation of resistance in its path.

In starting the vehicle, or in braking, if such is desired, the pedal is first fully depressed, thereby bringing in all the resistance and, preferably, finally breaking the circuit. The required magnets are next put into circuit by means of the hand-controller, and then the pedal is gradually released; thus first completing the circuit through the maximum resistance, and then, gradually, cutting out resistance. Usually the pedal needs to be depressed only when the automobile to which the gear-box is applied is started from rest, or in braking if such is required.

By the use of this invention, the operations to be performed by the driver in starting correspond with those which need to be performed in starting an automobile of ordinary construction, that is to say, the pedal is depressed, then the required speed or reverse is brought in, and then the pedal is allowed to rise gradually, and therefore anyone who has been accustomed to drive an automobile of ordinary construction can readily drive an automobile which has a gear-box of the type defined in the opening paragraph hereof which is adapted to be controlled in the manner of this invention.

In the accompanying drawings—

Figure 1 is an elevation, partly diagrammatic, of one construction embodying the present invention;

Fig. 2 is a plan of the current-strength controller of Fig. 1 with a portion of the cover removed to disclose the interior;

Fig. 3 is a section on the line 3—3 of Fig. 2.

The apparatus shown in Fig. 1 comprises a pedal A pivoted at $A^1$ and intended to be used as the ordinary clutch-pedal in the construction usually employed in automobiles. Instead, however, of operating the usual clutch, the pedal is connected by a link B with a controller C, the construction of which is hereinafter more fully described with reference to Figs. 2 and 3. A return spring D is provided tending to bring the pedal always into the raised position in which it is seen in Fig. 1. At E is indicated, in a diagrammatic manner however, a multiple-way switch connected to a gear-box F of the type defined in the opening paragraph of the specification. A battery is indicated at G, and it is to be understood that the parts E, F, G form no part in themselves of the present invention but are constructed and interconnected in a known manner. In practice the switch E takes the form of a gear-change lever so situated on the car as to be within ready reach of the driver.

The controller C comprises a number of resistance coils H supported on bobbins H¹ in any convenient manner and a number of resilient fingers J, J¹, J², etc., to which are electrically connected tappings taken from successive points on the resistance H so that each successive finger J—J⁵ is connected to a corresponding point farther along the resistance H.

A spindle K is rotatably mounted in the gear-box and on it is mounted a cylinder K¹ of insulating material within which is secured a bar L of metal. The spindle projects through the casing wall at one end and carries a crank M to whose free end the rod B is pivotally attached as shown in Figs. 1, 2 and 3.

The finger J⁶ is carried by and connected to a terminal O and one end of the resistance H is connected by a wire P¹ to a terminal P which further supports and is connected to the finger J⁵. The other end of the resistance H is connected by a wire H² to the finger J.

The fingers J—J⁵ and the finger J⁶ have their lengths so selected in relation to the circumferential width of the strip L that as the cylinder K¹ is rotated and the strip L moved under the tip of the finger J⁶, the fingers J—J⁵ are successively connected to the finger J⁶ but so that two of these are always in contact with the strip L at one time, a fresh one being brought into contact just before the one previously brought in leaves contact. The rotation of the spindle K is limited in any convenient way, for example by limiting the movement of the pedal A and in one extreme angular position of the spindle the finger J⁶ alone makes contact with the strip L. Alternatively the limit may be so set that even this finger breaks contact with the strip. This position of the spindle and cylinder K K¹ corresponds with the fully-depressed position of the pedal A so that in the depressed position there is no circuit between the terminals O and P. As, however, the pedal is allowed to rise, circuit is first established between the fingers J J⁶, thus connecting the terminals O P through the whole of the resistance H, and then, as rotation of the spindle K continues, the fingers J—J⁵ are successively brought into circuit with the finger J⁶, so gradually cutting out the resistance until, when J⁵ and J⁶ are both upon the strip L simultaneously, the terminals O and P are directly connected together through these fingers.

It will readily be seen therefore, that in use depression of the pedal A has the effect of de-clutching, and allowing it to rise causes the magnets thrown in by the switch E to be energized in a gradual manner corresponding with a gradual clutching effected by a friction-clutch of the usual type.

What I claim as my invention and desire to secure by Letters Patent is:—

1. In automobile control apparatus the combination of, a pedal, a conductor-bar, a plurality of contactor fingers of diverse length having their tips directed toward the bar, a support to carry the bar and fingers so constructed that relative movement can take place between the bar and fingers about an axis parallel to the length of the bar, an electrical resistance, tappings connecting points on the resistance to the said fingers, and means operatively connected to the said pedal for producing the said relative movement between the bar and fingers, substantially as set forth.

2. In automobile control apparatus the combination of a pedal, a conductor-bar carried upon an insulating support and rotatably mounted in a housing about an axis parallel to the length of the bar, a plurality of contactor fingers of diverse length secured to the housing and having their tips directed to lie upon the conductor-bar and its support, an electrical resistance, tappings connecting the said fingers to points on the said resistance, and means operatively connecting the pedal with the said conductor-bar such that the bar may be rotated by the pedal, substantially as set forth.

3. In automobile control apparatus the combination of, a spring-returned pedal, a conductor-bar carried upon an insulating support and mounted to rotate between limits about an axis parallel to the length of the bar, a plurality of contactor fingers of diverse length secured to the housing and having their tips directed to lie upon the conductor-bar and its support and of such lengths that not less than two finger-tips rest simultaneously upon the conductor-bar, an electrical resistance, tappings connecting the said fingers to points on the resistance in such a manner that the two tappings between which the greatest portion of the resistance is comprised are connected to the two fingers which simultaneously lie upon the conductor-bar when in one extreme position, and means so operatively connecting the pedal with the conductor-bar that when the pedal is spring-returned one of said two fingers and another finger combining to short circuit the resistance are simultaneously upon the conductor-bar, substantially as set forth.

In testimony whereof I affix my signature.

THOMAS WARDELL.